Oct. 18, 1932.   E. A. DAHL   1,883,598
HOLDER FOR HOGS AND OTHER ANIMALS
Filed Aug. 21, 1931
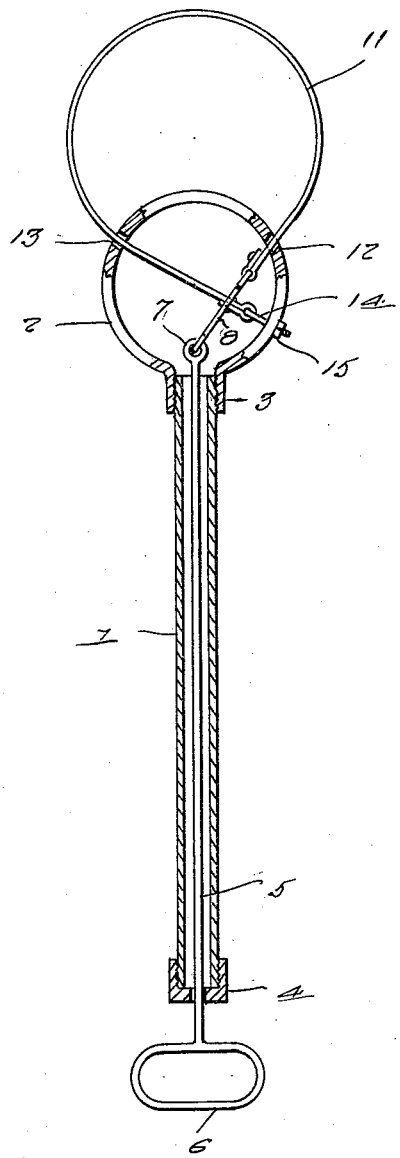
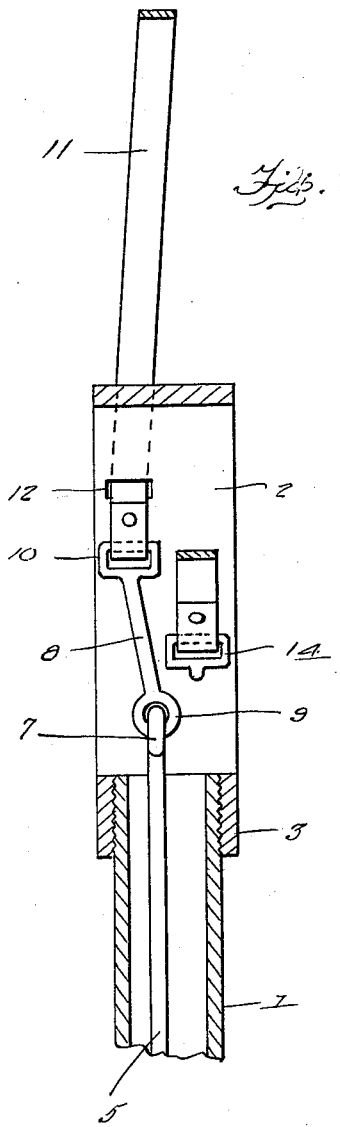
Inventor
E. A. Dahl
By Clarence A. O'Brien
Attorney Patented Oct. 18, 1932

1,883,598

UNITED STATES PATENT OFFICE

EARL A. DAHL, OF HOOPER, NEBRASKA

HOLDER FOR HOGS AND OTHER ANIMALS

Application filed August 21, 1931. Serial No. 558,611.

This invention relates to a holder for hogs and other animals, the general object of the invention being to provide a band of flexible material with manually operated means for contracting a loop formed by the band, about a part of the animal, so as to hold this animal.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a longitudinal sectional view of the invention with parts in section.

Fig. 2 is a vertical sectional view through the upper part of Fig. 1.

In these views, the numeral 1 indicates a tube having both ends threaded with a ring member 2 having a nipple 3 thereon which is threaded to one end of the tube 1. A cap 4 is threaded to the other end of the tube and is perforated for the passage of a rod 5 which is formed with a handle loop 6 at its outer end. This rod passes through the tube 1 and has an eye 7 at its inner end.

A slightly diagonally arranged link 8 has an eye 9 at one end thereof which engages the eye 7 and the other end of the link is formed with a rectangular shaped eye 10. A band 11 of flexible steel or the like passes through an opening 12 formed in one side of the ring 2 adjacent the top thereof, and this end of the band passing through the eye 10 and is folded upon itself and riveted so as to connect this end of the band with the link. The other end of the band passes through an opening 13 in the ring and which is arranged opposite the opening 12 and from this opening 13 the band extends across the ring 2 in a diagonal manner, and is connected to the rectangular eye 14 which has a stem, passing through a wall of the ring 2 and threaded to receive a nut 15.

As shown in Fig. 2, the eye 14 is placed to one side of the plane of opening 12 so that the ends of the band are offset from each other so that the link 8 can move without interference from the opposite end of the band and the eye 14.

When the rod 5 is pushed inwardly, the band 11 will be expanded so that it can be placed over the snout or other part of a hog or other animal, and then by moving the tube 1 and the rod 5, relative to each other, the band will be contracted over the snout or other part of the animal, so that the animal will be held.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. An animal holder of the class described comprising a hollow handle, a ring member attached to one end thereof and having a pair of holes therein, oppositely arranged, a flexible band having its ends passing through said holes, a rod passing through the handle and slidably arranged therein, a link connecting the inner end of the rod to one end of the band, the other end of the band passing diagonally across the ring member and being fastened to that side of the ring member which contains the hole through which that end of the band passes which is connected to the link, and a handle connected to the outer end of the rod.

2. An animal holder of the class described comprising a hollow handle, a ring-shaped member connected to one end of the handle and having a pair of holes therein, oppositely arranged, a flexible band having its ends passing through said holes, one end of the band passing from one of said holes diagonally across the ring-shaped member and connected with that part of the ring-shaped member diagonally opposite the last-mentioned hole, a rod passing thru the handle and slidably arranged therein, and means for connecting the opposite end of the band to said rod.

In testimony whereof I affix my signature.

EARL A. DAHL.